(12) United States Patent
Mori

(10) Patent No.: US 10,946,779 B2
(45) Date of Patent: Mar. 16, 2021

(54) VEHICLE SEAT

(71) Applicant: TOYOTA JIDOSHA KABUSHIKI KAISHA, Toyota (JP)

(72) Inventor: Kazuya Mori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/532,557

(22) Filed: Aug. 6, 2019

(65) Prior Publication Data
US 2020/0070705 A1 Mar. 5, 2020

(30) Foreign Application Priority Data

Aug. 30, 2018 (JP) ................. 2018-161141

(51) Int. Cl.
*B60N 2/90* (2018.01)

(52) U.S. Cl.
CPC .............. *B60N 2/995* (2018.02); *B60N 2/933* (2018.02)

(58) Field of Classification Search
CPC ..... B60N 2/42709; B60N 2/995; B60N 2/933
See application file for complete search history.

(56) References Cited

U.S. PATENT DOCUMENTS

| 5,294,175 A * | 3/1994 | Elton ................... B60N 2/4221 297/216.1 |
| 7,195,316 B2 * | 3/2007 | Shimasaki ............. A47C 7/024 297/284.11 |
| 2005/0173948 A1 * | 8/2005 | Boehmer ............... B60N 2/995 297/69 |
| 2005/0173963 A1 * | 8/2005 | Edrich .................... B60N 2/62 297/423.28 |

FOREIGN PATENT DOCUMENTS

| JP | 2000-157366 A | 6/2000 |
| JP | 2005-238931 A | 9/2005 |
| JP | 2006-151169 A | 6/2006 |
| JP | 2010-004916 A | 1/2010 |

* cited by examiner

*Primary Examiner* — Philip F Gabler
(74) *Attorney, Agent, or Firm* — Oliff PLC

(57) ABSTRACT

A vehicle seat includes a seat cushion, an ottoman, and an energy absorbing portion. The ottoman is provided at a seat front side end portion of the seat cushion and is changeable between an unfolded position and a stored position. The ottoman, at the unfolded position, is adapted to support, from a seat lower side, calves of the passenger seated on the seat cushion, and the ottoman, at the stored position, is apart from the calves of the passenger seated on the seat cushion. The energy absorbing portion is configured to, in a case in which a load, which is inputted to the ottoman at the stored position toward a seat rear side, exceeds a predetermined value, absorb kinetic energy inputted to the ottoman while permitting displacement of the ottoman toward the seat rear side.

6 Claims, 2 Drawing Sheets

VEHICLE SEAT

CROSS-REFERENCE TO RELATED APPLICATION

This application claims priority under 35 USC 119 from Japanese Patent Application No. 2018-161141 filed Aug. 30, 2018, the disclosure of which is incorporated by reference herein in its entirety.

BACKGROUND

Technical Field

The present disclosure relates to a vehicle seat.

Related Art

Japanese Patent Application Laid-Open (JP-A) No. 2000-157366 discloses an ottoman device that is applied to a vehicle seat. The ottoman device disclosed in that document has an ottoman on which a passenger places his/her legs. The ottoman can be displaced from an unfolded position, at which the passenger can place his/her legs thereon, to a stored position. Further, in the ottoman device disclosed in that document, in the state in which the ottoman is positioned at the unfolded position and the legs of the passenger are placed thereon, the ottoman can be retracted in case of a vehicle head-on collision. Due thereto, the injury degree of the legs of the passenger that are placed on the ottoman is reduced.

SUMMARY

It may be possible that the calves of the passenger seated in the vehicle seat will contact the ottoman that is disposed at the stored position in case of a head-on collision of the vehicle having a vehicle seat that faces toward a vehicle rear side or in case of a rear-end collision of the vehicle having a vehicle seat that face toward a vehicle front side.

In view of the above-described circumstances, an object of the present disclosure is to obtain a vehicle seat that can reduce the injury degree of the calves of a passenger.

A vehicle seat of a first aspect of the present disclosure has a seat cushion, an ottoman, and an energy absorbing portion. The seat cushion is adapted to support buttocks of a passenger, and the ottoman is provided at a seat front side end portion of the seat cushion, and is changeable between an unfolded position and a stored position. The ottoman, at the unfolded position, is adapted to support, from a seat lower side, calves of the passenger seated on the seat cushion. The ottoman, at the stored position, is apart from the calves of the passenger seated on the seat cushion. When a load inputted to the ottoman, which is positioned at the stored position, toward a seat rear side exceeds a predetermined value, the energy absorbing portion is configured to absorb kinetic energy inputted to the ottoman while permitting displacement of the ottoman toward the seat rear side.

In accordance with the vehicle seat of the first aspect, in the state in which the ottoman is positioned at the unfolded position, the calves of the passenger are supported by the ottoman from the seat lower side. In a case of a vehicle head-on collision in a state in which the ottoman is positioned at the stored position and the vehicle seat is facing toward the rear side of the vehicle, or in a case of a vehicle rear-end collision in a state in which the ottoman is positioned at the stored position and the vehicle seat is facing toward the front side of the vehicle, the ottoman is pushed toward the seat rear side by the legs (the calves) of the vehicle occupant.

Then, when the load inputted to the ottoman toward the seat rear side exceeds a predetermined value, the kinetic energy that is inputted to the ottoman is absorbed while displacement of the ottoman toward the seat rear side is permitted by the energy absorbing portion. Due thereto, a rise in a contact pressure between the ottoman and the calves of the passenger is suppressed, and the injury degree of the calves of the passenger can be reduced.

In a vehicle seat of a second aspect of the present disclosure, in the vehicle seat of the first aspect, the ottoman has a rotating shaft whose rotational axis direction is along a seat transverse direction, the ottoman is able to tilt in a seat front-rear direction, and a portion of the rotating shaft is the energy absorbing portion. When a load inputted to the ottoman, which is positioned at the stored position, toward the seat rear side exceeds a predetermined value, the energy absorbing portion of the rotating shaft is torsionally deformed, and the ottoman is tilted from the stored position toward the seat rear side.

In accordance with the vehicle seat of the second aspect, the ottoman is supported, so as to be able to tilt in the seat front-rear direction, via the rotating shaft. Further, when the ottoman is positioned at the stored position, in a case in which the load, which is inputted to the ottoman from the legs (the calves) of the passenger toward the seat rear side, exceeds a predetermined value, the energy absorbing portion of the rotating shaft is torsionally deformed. Due thereto, the kinetic energy that is inputted to the ottoman is absorbed, while the ottoman is tilted from the stored position toward the seat rear side. In this way, in accordance with the vehicle seat of the second aspect, the kinetic energy of the legs of the passenger can be absorbed by a portion of the rotating shaft that supports the ottoman. As a result, the mechanism that supports the ottoman is prevented from becoming complex.

In a vehicle seat of a third aspect of the present disclosure, in the vehicle seat of the second aspect, a driving section is connected to the rotating shaft, and a restricting portion is provided between the driving section and the energy absorbing portion. Due to the driving section being operated, the rotating shaft is rotated, and the ottoman is tilted from the stored position to the unfolded position, or the ottoman is tilted from the unfolded position to the stored position. The restricting portion, by restricting rotation of the rotating shaft, restricts tilting of the ottoman, which is positioned at the stored position, toward the seat rear side.

In accordance with the vehicle seat of the third aspect, due to the driving section being operated, the rotating shaft is rotated toward the one side, and the ottoman is tilted from the stored position to the unfolded position. Further, due to the driving section being operated, the rotating shaft is rotated toward the other side, and the ottoman is tilted from the unfolded position to the stored position. In the vehicle seat of the third aspect, the restricting portion is provided between the driving section and the energy absorbing portion. The restriction portion, by restricting rotation of the rotating shaft, restricts tilting of the ottoman, which is positioned at the stored position, toward a seat rear side. Therefore, the torque, which arises at the rotating shaft due to load toward the seat rear side being inputted from the legs (the calves) of the passenger to the ottoman, is not transmitted to the driving section. Due thereto, there is no need to provide, at the driving section, a mechanism for resisting this torque, and the structure of the driving section is prevented from becoming complex.

The vehicle seat relating to the present disclosure has the excellent effect of being able to reduce the injury degree of the calves of a passenger.

DETAILED DESCRIPTION

Figure 1:
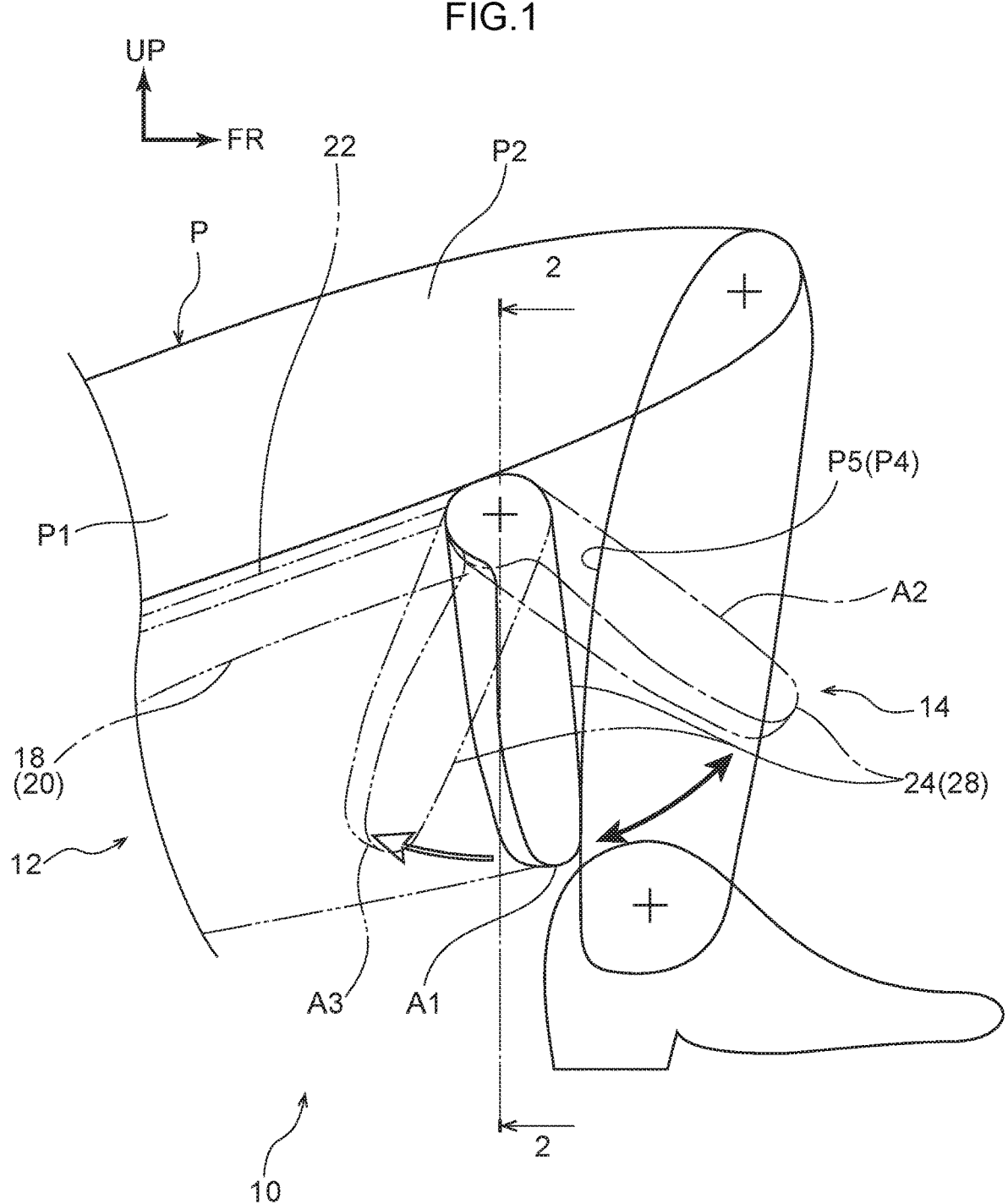
FIG. 1 is a side view schematically showing a vehicle seat of an embodiment of the present disclosure.
Figure 2:
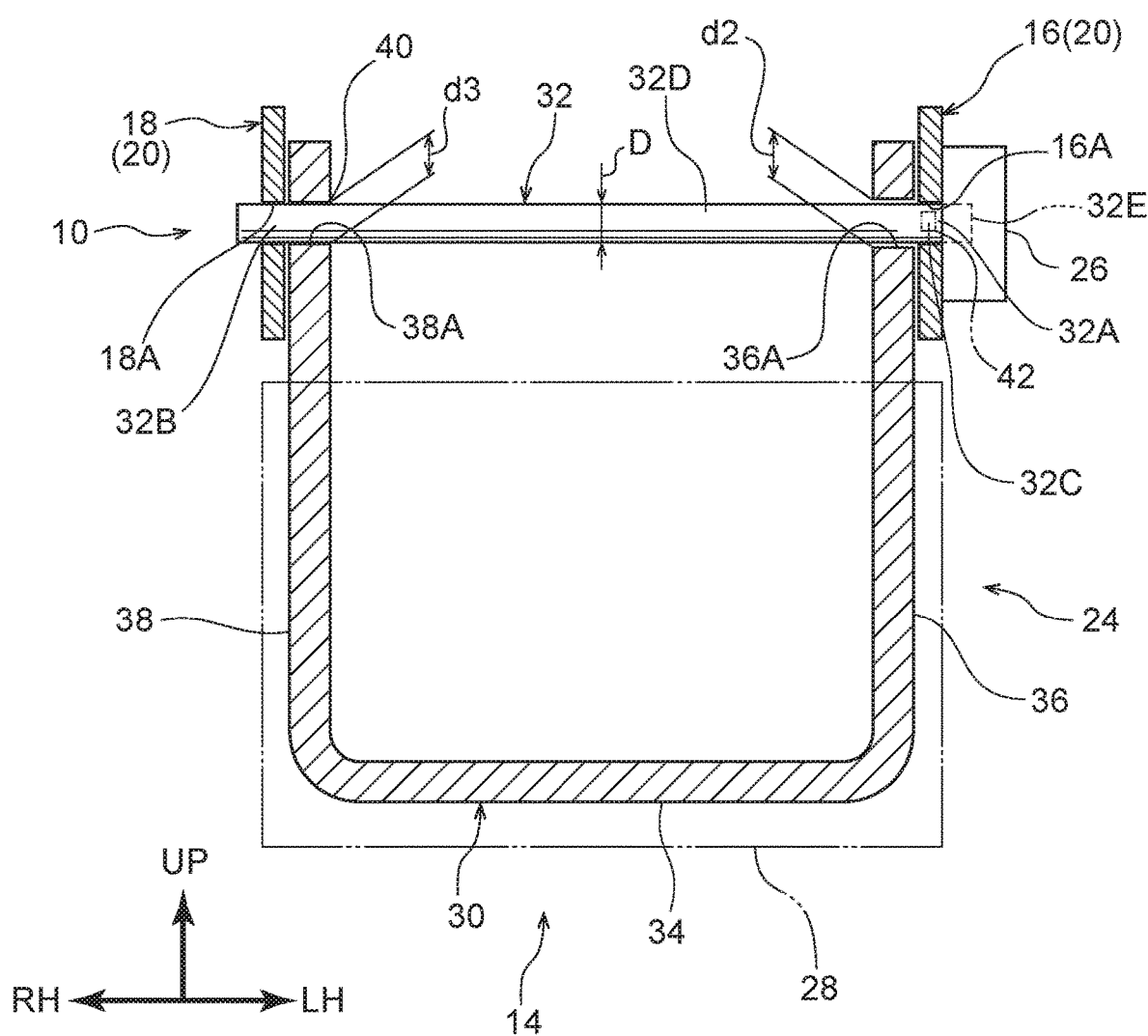
FIG. 2 is a cross-sectional view showing the cross-section of a portion of a seat cushion and an ottoman device that are cut along line 2-2 of FIG. 1.

A vehicle seat 10 relating to an embodiment of the present disclosure is described by using FIG. 1 and FIG. 2. Note that, in the following explanation, when description is given by using front-rear, left-right and up-down directions, they refer to the front-rear, the left-right, and the up-down directions as seen from the passenger who is seated in the vehicle seat 10. Further, arrow FR that is shown appropriately in the respective drawings indicates the seat frontward direction, arrow UP indicates the seat upward direction, arrow RH indicates the seat rightward direction, and arrow LH indicates the seat leftward direction. Further, the left-right direction coincides with the seat transverse direction.

As shown in FIG. 1, the vehicle seat 10 of the present embodiment has a seat cushion 12 that supports buttocks P1 and a femoral region P2 of a passenger P (seated passenger), an unillustrated seatback that supports a back portion of the passenger P, and an ottoman device 14 that is provided at a front end portion of the seat cushion 12 and that supports calves P5 of the passenger P. Here, the vehicle seat 10 of the present embodiment is provided in the cabin of a self-driving vehicle. FIG. 1 illustrates a state in which the vehicle seat 10 is fixed such that a front side of the seat facing toward the rear side of the vehicle. Note that there may be a structure in which the front side of the vehicle seat 10 is made to face toward the front side of the vehicle due to the vehicle seat 10 being rotated.

As shown in FIG. 1 and FIG. 2, the seat cushion 12 has a pair of left and right side frames 16, 18 that structure portions of a frame 20 of the seat cushion 12, and a seat cushion pad 22 that is covered by a skin material and is mounted to the frame 20 of the seat cushion 12. Note that the frame 20 of the seat cushion 12 is further structured by a lateral frame that is panel-shaped or rod-shaped and spans between the pair of left and right side frames 16, 18, and the like.

The ottoman device 14 is structured to include an ottoman 24 that supports the calves P5 of the passenger P, and a driving section 26 that tilts the ottoman 24.

As shown in FIG. 2, the ottoman 24 has an ottoman main body 28 that is formed in the shape of a rectangular plate, a U-shaped frame 30 and to which the ottoman main body 28 is mounted, and a rotating shaft 32 that is fixed to the U-shaped frame 30.

The U-shaped frame 30 has a first frame portion 34 that extends in the left-right direction, a second frame portion 36 that extends from a left side end portion of the first frame portion 34 toward a seat cushion 12 (see FIG. 1) side, and a third frame portion 38 that extends from a right side end portion of the first frame portion 34 in parallel with the second frame portion 36. In the state in which the ottoman main body 28 is mounted to the U-shaped frame 30, end portions, which are at a side opposite the first frame portion 34, of the second frame portion 36 and the third frame portion 38 project-out from the ottoman main body 28. Rotating shaft insert-through holes 36A, 38A, through which the rotating shaft 32 is inserted, are respectively formed at these end portions of the second frame portion 36 and the third frame portion 38. Inner diameter d2 of the rotating shaft insert-through hole 36A that is formed at the second frame portion 36 is set to be larger than outer diameter D of the rotating shaft 32 that is described later. Inner diameter d3 of the rotating shaft insert-through hole 38 that is formed at the third frame portion 38 is set to be substantially the same as the outer diameter D of the rotating shaft 32. Further, in the state in which the rotating shaft 32 is inserted-through the rotating shaft insert-through hole 36A and the rotating shaft insert-through hole 38A, the peripheral edge portion of the rotating shaft insert-through hole 38A and the outer peripheral portion of the rotating shaft 32 are joined by welding. The portion, at which the peripheral edge portion of the rotating shaft insert-through hole 38A and the outer peripheral portion of the rotating shaft 32 are joined by welding, is called joined-by-welding portion 40. Note that, in FIG. 2, the difference between the inner diameters d2, d3 of the rotating shaft insert-through holes 36A, 38A is illustrated in an exaggerated manner.

Further, a portion 32A of the rotating shaft 32, which projects-out toward the left side from the rotating shaft insert-through hole 36A of the second frame portion 36, is inserted-through a shaft supporting hole 16A that is formed at the side frame 16 that is at the left side. A portion 32B of the rotating shaft 32, which projects-out toward the right side from the rotating shaft insert-through hole 38A of the third frame portion 38, is inserted-through a shaft supporting hole 18A that is formed at the side frame 18 at the right side. Due to the rotating shaft 32 rotating (pivoting) with supported by these shaft supporting holes 16A, 18A, the U-shaped frame 30 and the ottoman main body 28 tilt in the seat front-rear direction.

In the present embodiment, a restricting portion 42 that restricts rotation of the rotating shaft 32 is provided at the portion 32A of the rotating shaft 32 and the peripheral edge portion of the shaft supporting hole 16A that is formed at the side frame 16. Due to this restricting portion 42 being provided, tilting, toward the rear side, of the ottoman main body 28 that is positioned at a stored position A1 that is described later is restricted. Note that the restricting portion 42 can be structured by a projection, which is fixed to the rotating shaft 32, and an abutted portion, which is fixed to the side frame 16 such that the projection abuts.

Further, a part of the rotating shaft 32 between a portion 32C, at which rotation is restricted by the restricting portion 42, and the joined-by-welding portion 40 is an energy absorbing portion 32D that is torsionally deformed as described later. The energy absorbing portion 32D of the rotating shaft 32 also functions as a torsion bar.

The driving section 26 is engaged with a left side end portion 32E of the rotating shaft 32. Note that the driving section 26 is an actuator such as a motor with a speed reducer or the like. The rotating shaft 32 is rotated toward one side due to the driving section 26 being operated.

Operation and Effects of Present Embodiment

Operation and effects of the present embodiment are described next.

As shown in FIG. 1 and FIG. 2, when the driving section 26 that structures a portion of the ottoman device 14 is operated, and the rotating shaft 32 is rotated toward the one side, the ottoman 24 is tilted from the stored position A1 shown by the solid line to an unfolded position A2 that is shown by the one-dot chain line. Due thereto, the calves P5 of the passenger P who is seated in the vehicle seat 10 can be supported from the seat lower side by the ottoman 24.

When, in the state in which the ottoman 24 is positioned at the unfolded position A2, the driving section 26 is operated and the rotating shaft 32 is rotated toward another side, the ottoman 24 is tilted from the unfolded position A2 to the stored position A1. Due thereto, the ottoman 24 is disposed at a position of being able to be apart from the calves P5 of the passenger P seated in the vehicle seat 10.

In case of the head-on collision of the vehicle in a state in which the vehicle seat 10 is facing toward the vehicle rear side and in a state in which the ottoman 24 is positioned at the stored position A1, the passenger P who is seated in the vehicle seat 10 inertially moves toward the seat rear side. Due thereto, legs P4 (the calves P5) of the passenger P push the ottoman 24 toward the seat rear side. When the load, which is inputted from the calves P5 to the ottoman 24 toward the seat rear side, exceeds a predetermined value, the energy absorbing portion 32D of the rotating shaft 32 is torsionally deformed. Due thereto, the ottoman 24 moves from the stored position A1 to retracted position A3 that is shown by the two-dot chain line. Due thereto, a rise in the contact pressure between the ottoman 24 and the calves P5 is suppressed, and the injury degree of the calves P5 of the passenger P can be reduced effectively. In the present embodiment, no member that structures the frame 20 of the seat cushion 12 is disposed on the path along which the ottoman 24 is tilted from the stored position A1 to the retracted position A3.

Note that, in case of the rear-end collision of the vehicle in a state in which the vehicle seat 10 of the present embodiment faces toward the vehicle front side and in a state in which the ottoman 24 is positioned at the stored position A1, similarly, the injury degree of the calves P5 of the passenger P can be reduced effectively.

Further, in the present embodiment, the restricting portion 42 is provided between the driving section 26 and the energy absorbing portion 32D. The restricting portion 42, by restricting rotation of the rotating shaft 32, restricts tilting of the ottoman 24, which is positioned at the stored position A1, toward the seat rear side. Therefore, the torque, which arises at the rotating shaft 32 due to load toward the seat rear side being inputted from the legs P4 (the calves P5) of the passenger P to the ottoman 24 is not transmitted to the driving section 26. Due thereto, there is no need to provide, at the driving section 26, a mechanism for resisting this torque, and the structure of the driving section 26 is prevented from becoming complex.

Note that in the present embodiment, the restricting portion 42 restricts tilting of the ottoman 24, which is positioned at the stored position A1, toward the seat rear side by restricting rotation of the rotating shaft 32. However, the present disclosure is not limited to this. For example, there may be a structure in which the restricting portion 42 is not provided, and a driving section is provided with a mechanism that restricts tilting toward the seat rear side of the ottoman 24, which is positioned at the stored position A1.

Further, in the present embodiment, the ottoman 24 is structured so as to be changeable between the unfolded position A2 and the stored position A1 due to the ottoman 24 tilting. However, the present disclosure is not limited to this. The ottoman may be changeable between the unfolded position and the stored position via a link mechanism or the like that is operated by the driving section.

Although an embodiment of the present disclosure has been described above, the present disclosure is not limited to the above, and can, of course, be implemented by being modified in various ways other than the above within a scope of the present disclosure.

What is claimed is:

1. A vehicle seat comprising:
   a seat cushion configured to support buttocks of a passenger;
   an ottoman provided at a seat front side end portion of the seat cushion, and changeable between an unfolded position and a stored position,
      wherein the ottoman, at the unfolded position, is configured to support, from a seat lower side, calves of the passenger seated on the seat cushion, and
      wherein the ottoman, at the stored position, is configured to be spaced apart from the calves of the passenger seated on the seat cushion; and
   an energy absorbing portion configured to, in a case in which a load that is inputted to the ottoman at the stored position toward a seat rear side exceeds a predetermined value, absorb kinetic energy inputted to the ottoman while permitting displacement of the ottoman toward the seat rear side.

2. The vehicle seat of claim 1, wherein:
   the ottoman has a rotating shaft whose rotational axis direction is along a seat transverse direction, the ottoman being able to tilt in a seat front-rear direction, and a part of the rotating shaft being the energy absorbing portion, and
   in a case in which a load, which is inputted to the ottoman positioned at the stored position toward the seat rear side, exceeds a predetermined value, the energy absorbing portion of the rotating shaft is configured to be torsionally deformed, and the ottoman is tilted from the stored position toward the seat rear side.

3. The vehicle seat of claim 2, wherein:
   a driving section is connected to the rotating shaft,
   a restricting portion is provided between the driving section and the energy absorbing portion,
   due to the driving section being operated, the rotating shaft is rotated, and the ottoman is tilted from the stored position to the unfolded position, or the ottoman is tilted from the unfolded position to the stored position, and
   the restricting portion, by restricting rotation of the rotating shaft, restricts tilting of the ottoman, positioned at the stored position, toward the seat rear side.

4. The vehicle seat of claim 2,
   wherein the ottoman includes a first frame portion extending in a left-right direction, a second frame portion that extends from a left side end portion of the first frame toward a seat cushion side, and a third frame portion that extends from a right side end portion of the first frame portion in parallel with the second frame portion,
   wherein end portions of the second frame portion and the third frame portion include through holes through which the rotating shaft is inserted, and an inner diameter of the through hole formed at the second frame portion is larger than an outer diameter of the rotating shaft.

5. The vehicle seat of claim 4,
   wherein an inner diameter of the through hole formed at the third frame portion is substantially the same as the outer diameter of the rotating shaft.

6. The vehicle seat of claim 4,
wherein a first portion of the rotating shaft projects out toward a left side from the through hole formed at the second frame portion and is inserted through a shaft supporting hole formed at a left side portion of a side frame of the seat cushion, and second portion of the rotating shaft projects out toward a right side from the through hole formed at the third frame portion and is inserted through a shaft supporting hole formed at a right side portion of the side frame of the seat cushion, and wherein a main body of the ottoman is configured to tilt in the seat front-rear direction due to the orientation of the rotating shaft inserted in the shaft supporting hole formed at the left side portion of the side frame of the seat cushion, and the shaft supporting hole formed at the right side portion of the side frame of the seat cushion.

\* \* \* \* \*